(12) United States Patent
Lin

(10) Patent No.: US 6,590,976 B1
(45) Date of Patent: Jul. 8, 2003

(54) TWO-STEP ALGORITHM FOR TRAINING AN ECHO CANCELLATION FILTER

(75) Inventor: Jingdong Lin, Irvine, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/574,935

(22) Filed: May 19, 2000

Related U.S. Application Data

(60) Provisional application No. 60/149,736, filed on Aug. 19, 1999.

(51) Int. Cl.[7] .............................................. H04M 11/06
(52) U.S. Cl. .............................. 379/406.1; 379/406.09; 370/292
(58) Field of Search ....................... 379/406.61, 406.06, 379/406.08, 406.09, 406.1, 406.11; 370/286, 290, 292

(56) References Cited

U.S. PATENT DOCUMENTS 4,473,906 A * 9/1984 Warnaka et al. ........... 381/73.1
5,222,084 A * 6/1993 Takahashi .............. 379/406.08

* cited by examiner

Primary Examiner—Forester W. Isen
Assistant Examiner—Daniel Swerdlow
(74) Attorney, Agent, or Firm—Steve Mendelsohn

(57) ABSTRACT

A two-step training method for the estimation filter in the echo cancellation (EC) path of the analog front-end (AFE) circuit for a modem, such as an asymmetric digital subscriber line (ADSL) modem. During the first step, the coefficients of a filter that is preferably equivalent to the combination of the EC path and the receive (RX) path in the AFE circuit are determined with the EC estimation filter held fixed and the transmit (TX) path in the AFE circuit disabled. During the second step, the TX path is enabled and the coefficients of the EC estimation filter are determined using the path equivalent filter generated during the first step. The two-step training method takes into account variations in the operating characteristics of components in the various processing paths in the AFE circuit to converge on satisfactory coefficients for the EC estimation filter within an acceptable number of training symbols.

34 Claims, 7 Drawing Sheets

TWO-STEP ALGORITHM FOR TRAINING AN ECHO CANCELLATION FILTER

CROSS-REFERENCE TO RELATED APPLICATIONS

This application claims the benefit of the filing date of U.S. provisional application no. 60/149,736, filed on Aug. 19, 1999.

BACKGROUND OF THE INVENTION

1. Field of the Invention

The present invention relates to telecommunications circuitry, and, in particular, to echo cancellation filters for interface units that interconnect analog and digital components, such as analog front-end circuits for modems.

2. Description of the Related Art

FIG. 1 shows a simplified block diagram of a conventional asymmetric digital subscriber line (ADSL) modem 100 that converts an existing twisted-pair telephone loop into an access path for multimedia and high-speed data communications in addition to analog voice signals. As shown in FIG. 1, ADSL modem 100 comprises a digital unit 102 (e.g., a digital signal processor (DSP)) configured to an analog front-end (AFE) circuit 104, which is in turn configured to a line interface unit 106. Digital unit 102 provides a digital transmit (TX) signal to AFE circuit 104, which converts the digital TX signal into an analog TX signal. AFE circuit 104 provides the analog TX signal to the line interface unit 106, which transmits the analog TX signal over the loop, while providing high-voltage, high-current electrical isolation between the loop and the terminal side of ADSL modem 100. At the same time, line interface unit 106 receives an analog signal from the loop and provides an analog receive (RX) signal to AFE circuit 104, which converts the analog RX signal into a digital RX signal, which is then presented to digital unit 102.

FIG. 2 shows a block diagram of AFE circuit 104 for a conventional ADSL modem, such as ADSL modem 100 of FIG. 1. As shown in FIG. 2, AFE circuit 104 has two parallel processing paths: a transmit path for the digital TX signal received from digital unit 102 and a receive path for the analog RX signal received from line interface unit 106. The transmit path comprises:

- TX digital shaping filter 202, which digitally shapes the digital TX signal according to a specified shaping function;
- TX 1:32 interpolator 204, which upsamples and interpolates the digital TX signal from filter 202 (for subsequent sigma-delta coding);
- TX sigma-delta digital-to-analog converter (DAC) 206, which converts the digital TX signal from interpolator 204 into a sigma-delta coded analog TX signal;
- TX analog low-pass filter (LPF) 208, which filters out high-frequency components from the analog TX signal from DAC 206; and
- TX programmable gain amplifier (PGA) 210, which amplifies the analog TX signal from LPF 208 to generate the analog TX signal that is presented to line interface unit 106. Analogously, the receive path comprises:
- RX PGA 212, which amplifies the analog RX signal received from line interface unit 106;
- RX analog LPF 214, which filters out high-frequency components from the analog RX signal from PGA 212; and
- RX sigma-delta analog-to-digital converter (ADC) 216, which converts the analog RX signal from LPF 214 into a sigma-delta decoded digital RX signal;
- RX 8:1 decimator 218, which downsamples the digital RX signal from ADC 216;
- RX 4:1 decimator 220, which further downsamples the digital RX signal from decimator 218; and
- RX digital filter 222, which digitally filters the digital TX signal from decimator 220 to generate the digital RX signal that is presented to digital unit 102.

For an ADSL modem, such as ADSL modem 100 of FIG. 1, the TX and RX signals are present on the telephone loop simultaneously with the transmitting and receiving operations being conducted at the same time. The standard technique for separating the signals for the TX and RX paths is based on impedance matching. If the terminating impedance of the line interface unit were exactly equal to the equivalent loop impedance, then the transmit and receive signals would be processed completely independently of one another by the TX and RX paths, respectively. However, since the equivalent loop impedance can vary significantly from one loop to another, no matter how the terminal impedance is designed in the line interface unit, a perfect match will not be achieved for all applications. As a result, there may be significant leakage of the transmit signal into the receive path, also known as echo, which can adversely affect the quality of the receive signal.

One way to address the problem of echo in the RX signal is to implement adaptive echo cancellation (EC) in the digital domain (e.g., implemented within digital unit 102). In that case, AFE circuit 104 does not have to get involved in the EC process. However, in applications with very long loops (e.g., about 10% of all loops), the ADC in the RX path of AFE circuit 104 cannot provide sufficient dynamic range to handle both a strong echo and a weak signal to allow the echo to be sufficiently canceled in the digital domain (i.e., after digitization). In that case, echo cancellation in the analog domain is needed to achieve better performance. With analog-domain EC, the echo is canceled before the ADC in the RX path. As a result, the RX ADC's dynamic range is no longer a performance limiting factor.

SUMMARY OF THE INVENTION

The present invention is directed to a scheme for training circuitry that performs echo cancellation (EC) in the analog domain, for example, for the AFE circuit of an ADSL modem. The present invention is based on EC circuitry that comprises an estimation filter that estimates, from the TX signal, the echo that will appear in the RX signal. According to certain embodiments of the present invention, the coefficients for the estimation filter are determined as a result of a two-step training algorithm. In the first step, the coefficients for the estimation filter are held fixed, while the coefficients of a path equivalent filter (i.e., a filter that is to be trained to be substantially equivalent to a combination of the EC and RX paths) are determined with the TX path disabled, white noise applied to the EC path, and no receive signal applied to the line interface unit. In the second step, the coefficients of the path equivalent filter determined during the first step are held fixed, and the output from the path equivalent filter is used to determine coefficients for the estimation filter, while applying sequences of TX signals to both the TX and EC paths with no receive signal being applied to the line interface unit. After training is complete, the path equivalent filter may be disabled and the coefficients for the estimation filter determined during the second training step are preferably held fixed during processing of real transmit and receive signals.

In one embodiment, the present invention is, in a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of (a) training a path equivalent filter to be substantially equivalent to a combination of the EC and RX paths, while keeping the EC estimation filter fixed; and (b) then training the EX estimation filter, with the path equivalent filter trained during step (a).

In another embodiment, the present invention is a circuit comprising (1) a transmit (TX) path configured to convert a digital TX signal into an analog TX signal; (2) a receive (RX) path configured to convert an analog RX signal into a digital RX signal; (3) an echo cancellation (EC) path configured to generate an analog EC signal, based on the digital TX signal, to be subtracted from the analog RX signal prior to digitization, wherein the EC path comprises an EC estimation filter; (4) a path equivalent filter; and (5) one or more coefficient update units. During a first training step, one of the one or more coefficient update units is configured to update coefficients in the path equivalent filter to train the path equivalent filter to be substantially equivalent to a combination of the EC and RX paths; and, during a second training step, one of the one or more coefficient update units is-configured to update coefficients in the EC estimation filter based on output from the path equivalent filter.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
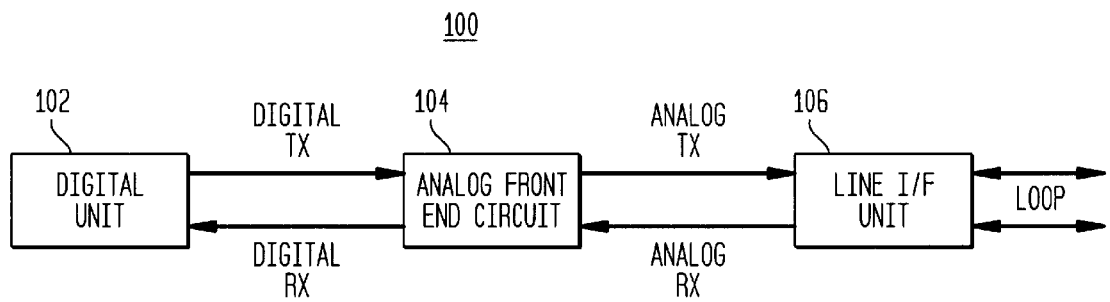
FIG. 1 shows a simplified block diagram of a conventional asymmetric digital subscriber line (ADSL) modem.
Figure 2:
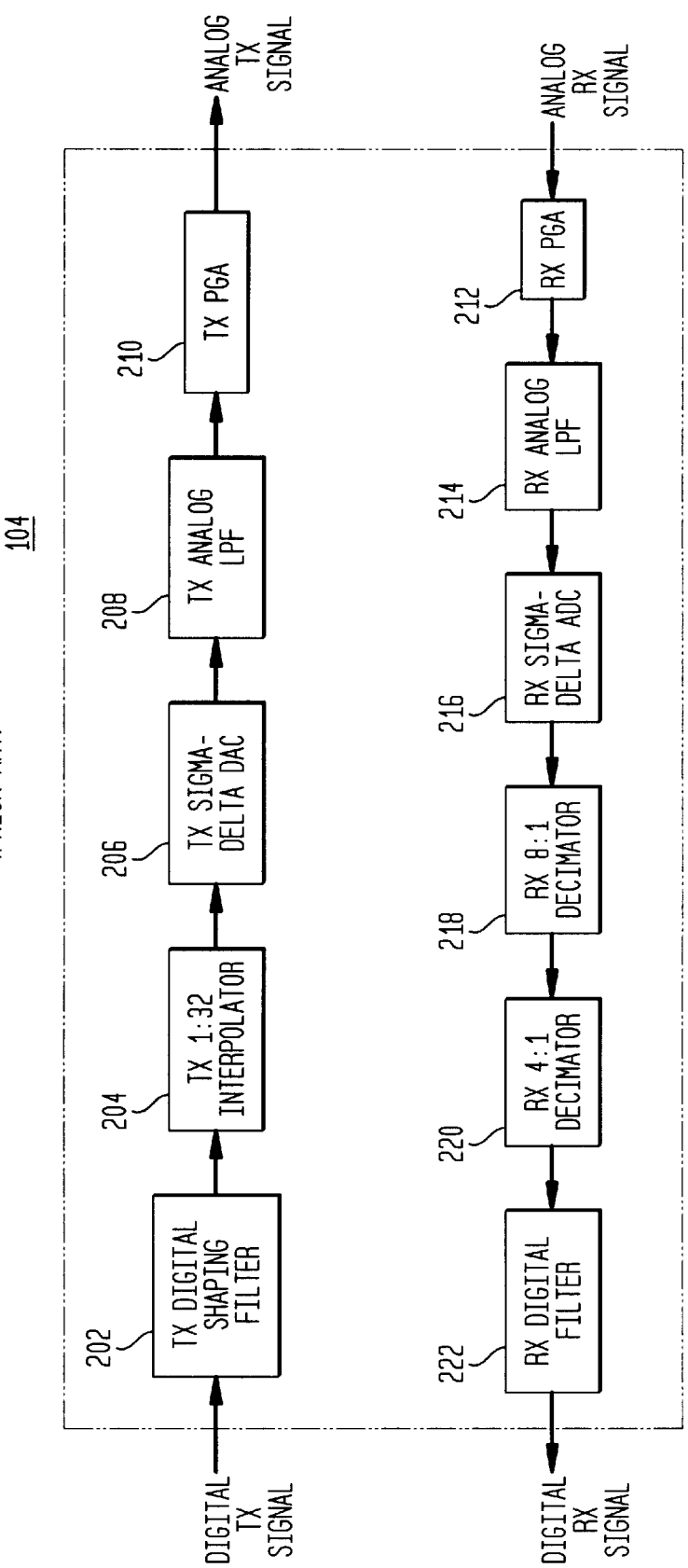
FIG. 2 shows a block diagram of the analog front-end (AFE) circuit for the ADSL modem of FIG. 1.
Figure 3:
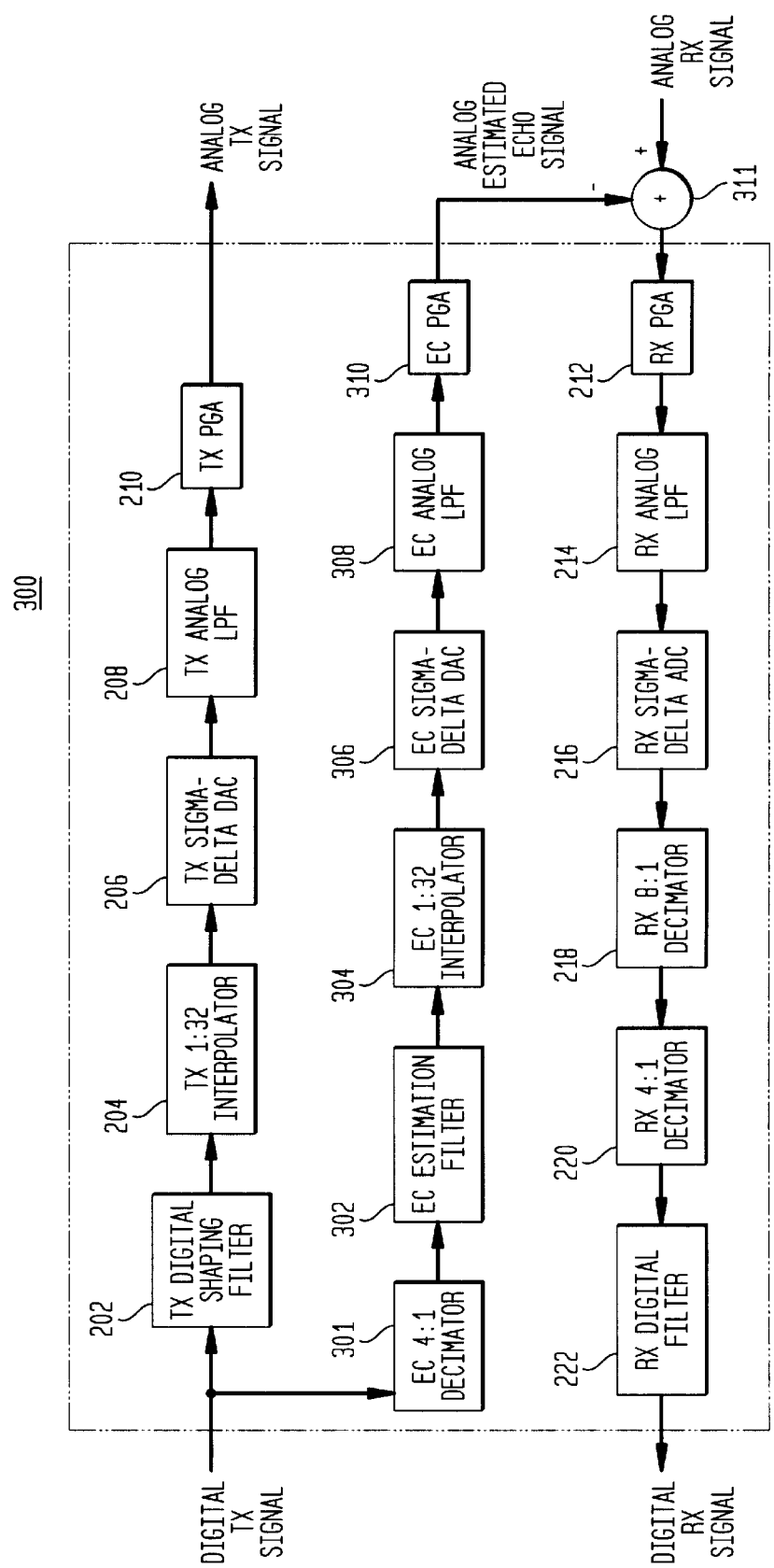
FIG. 3 shows a block diagram of an AFE circuit for an ADSL modem, according to one embodiment of the present invention.

FIG. 3 shows a block diagram of an AFE circuit 300 for an ADSL modem, according to one embodiment of the present invention. As shown in FIG. 3, in addition to the conventional components in the TX and RX paths as in AFE circuit 104 of FIG. 2, AFE circuit 300 also has an echo cancellation (EC) path, which uses the digital TX signal from digital unit 102 of FIG. 1 to generate an analog estimated echo signal that is to be subtracted from the RX signal from line interface unit 106 in the analog domain prior to digitization (as indicated in FIG. 3 by summation node 311). In one possible embodiment, summation node 311 is implemented as part of a hybrid circuit in the line interface unit of the ADSL modem, although other configurations are possible, including those where summation node 311 is implemented within AFE circuit 300.

As indicated in FIG. 3, the EC path comprises:

EC 4:1 decimator 301, which downsamples the digital TX signal received by AFE circuit 300 from the digital unit;

EC estimation filter 302, which generates a digital echo cancellation (EC) signal from the digital signal from decimator 301;

EC 1:32 interpolator 304, which upsamples and interpolates the digital EC signal from filter 302 (for subsequent sigma-delta coding);

EC sigma-delta DAC 306, which converts the digital EC signal from interpolator 304 into a sigma-delta coded analog EC signal;

EC analog LPF 308, which filters out high-frequency components from the analog EC signal from DAC 306; and EC PGA 310, which amplifies the analog EC signal from LPF 308 to generate the analog estimated echo signal that is subtracted from the analog RX signal at summation node 311.

The echo cancellation technique employed by AFE circuit 300 is designed for a full-rate ADSL modem. This EC technique is designed to reduce in-band echo before the AFE circuit (i.e., before digitization) both (1) to prevent the input peak-to-peak voltage to the AFE circuit from becoming too high and (2) to prevent the ADC in the RX path of AFE circuit 300 from being jammed (i.e., saturated) by a strong echo signal. Combined with hybrid echo suppression, the present invention can reduce echo by up to 70 dB in the frequency band of 25–138 KHz. Any remaining echo can be removed by an echo cancellation module that is implemented purely in the digital domain (e.g., within digital unit 102 of FIG.

For a full-rate ADSL modem, the sampling frequency for the transmit path is 2208 KHz, while the sampling frequency of the receive path is 552 KHz. With these sampling frequencies, any aliasing from frequency folding will not adversely affect the echo cancellation performance in the desired frequency band and the estimation filter length can be kept within a tolerable range (e.g., less than about 128 coefficients).

According to one embodiment of the present invention, the coefficients for EC estimation filter 302 are determined during a two-step training algorithm. In the first step, the coefficients for EC estimation filter 302 are held fixed, while the coefficients of a path equivalent filter (i.e., a filter that is to be trained to be substantially equivalent to a combination of the EC and RX paths) are determined with the TX path disabled, white noise applied to the EC path, and no receive signal applied to line interface unit 106. In the second step, the coefficients of the path equivalent filter determined during the first step are held fixed, and the output from the path equivalent filter is used to determine coefficients for EC estimation filter 302, while applying sequences of TX signals to both the TX and EC paths with no receive signal being applied to line interface unit 106. After training is complete, the path equivalent filter may be disabled and the coefficients for EC estimation filter 302 determined during the second training step are preferably held fixed during processing of real transmit and receive signals. The two steps of this training algorithm are illustrated in FIGS. 4 and 5.

Figure 4:
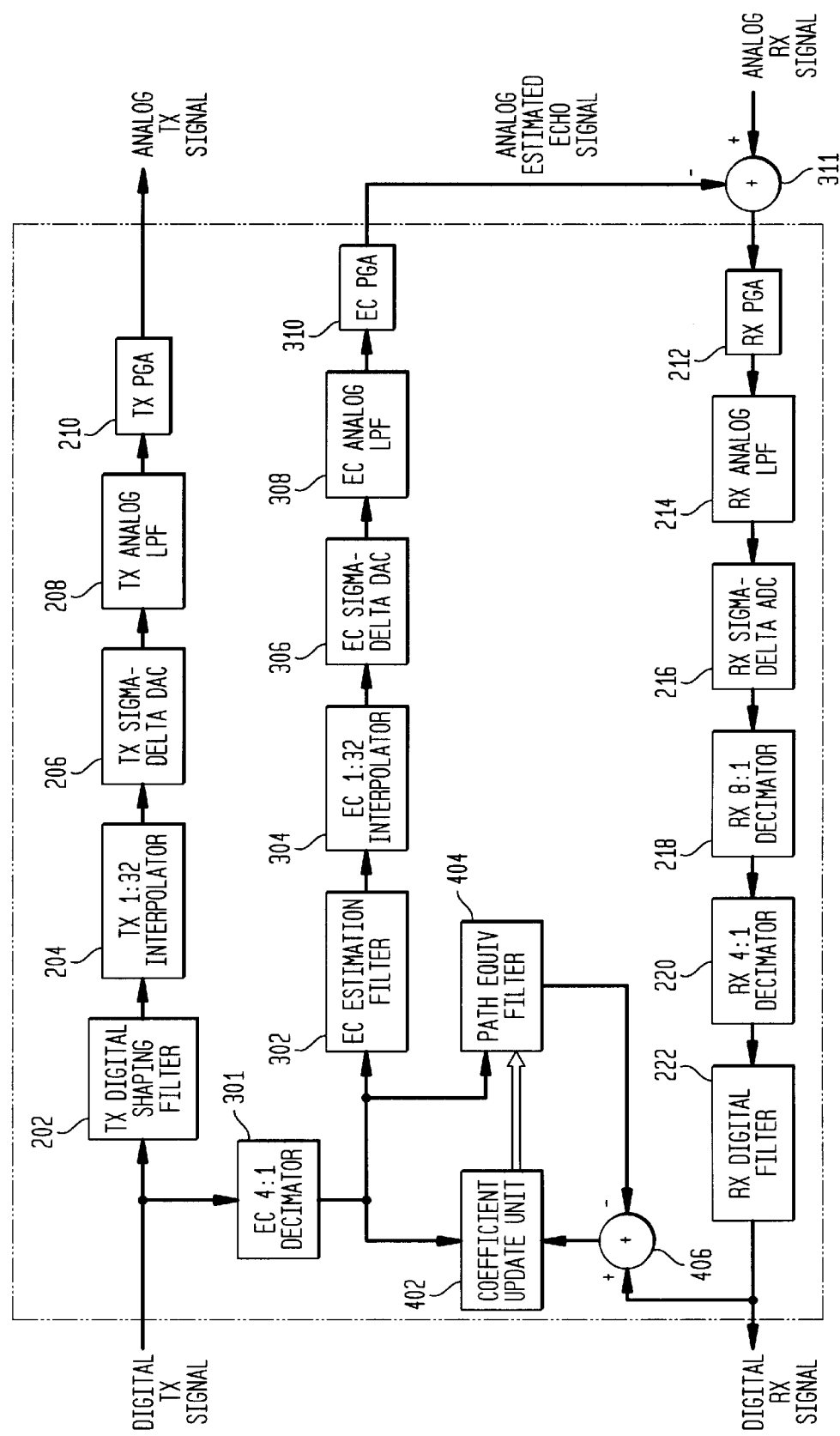
FIG. 4 shows a block diagram of the AFE circuit of FIG. 3, as configured for the first step of the two-step training algorithm, according to one embodiment of the present invention.

FIG. 4 shows a block diagram of AFE circuit 300 of FIG. 3, as configured for the first step of the two-step training algorithm, according to one embodiment of the present invention. As shown in FIG. 4, for the first training step, in addition to the components described previously in the context of FIG. 3, AFE circuit 300 comprises a coefficient update unit 402, a path equivalent filter 404, and a summation node 406.

As configured for the first training step, path equivalent filter 404 receives the digital signal generated by EC 4:1 decimator 301 and generates a digital filtered signal, which is applied to summation node 406. Summation node 406 generates the difference between the digital RX signal generated by RX digital filter 222 and the digital filtered signal from path equivalent filter 404. Coefficient update unit 402 receives the digital signal generated by EC 4:1 decimator 301 as well as the digital signal generated by summation node 406 and generates control signals that are used to update the coefficients in path equivalent filter 404. The thick arrow in FIG. 4 indicates these control signals.

Figure 5:
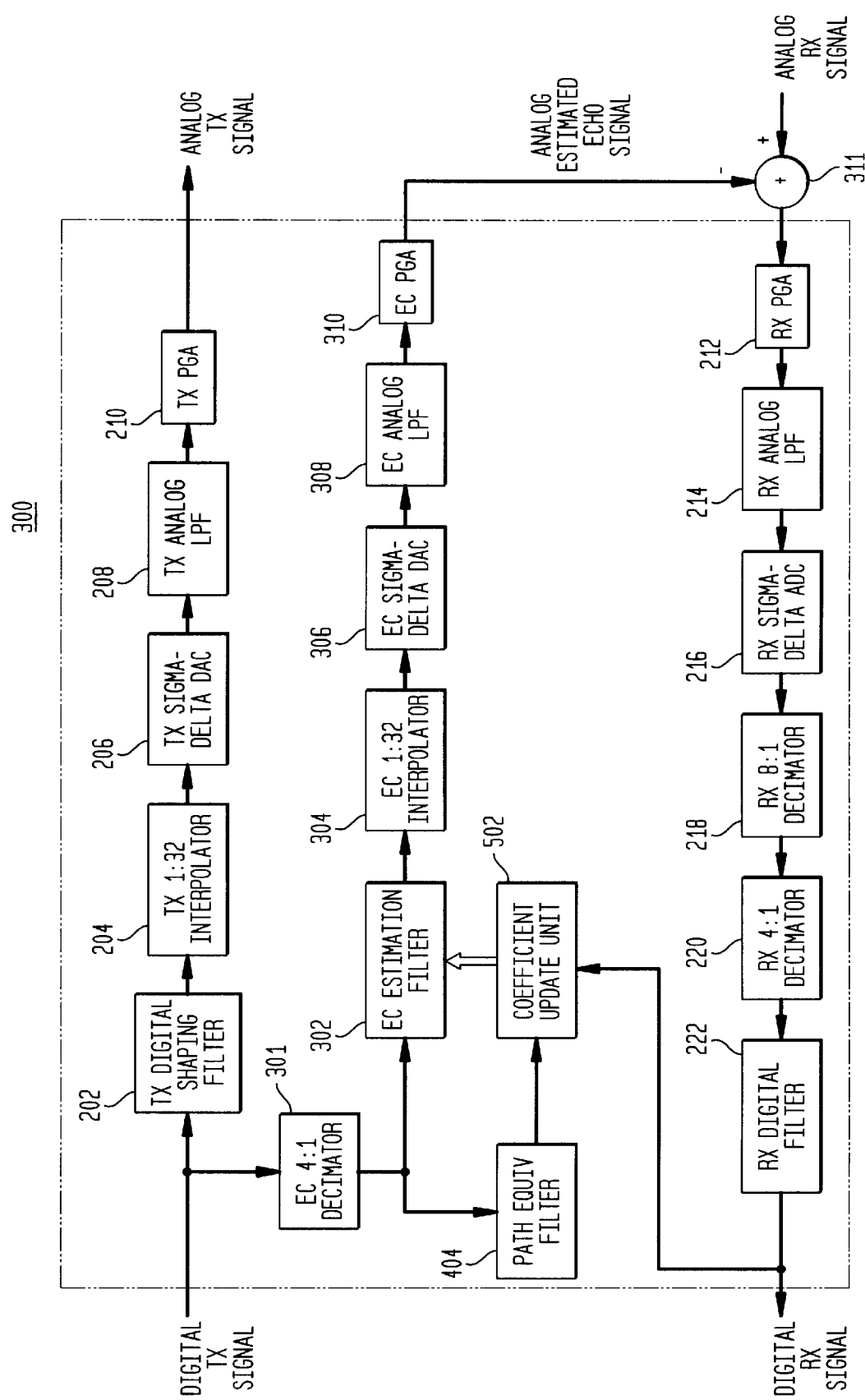
FIG. 5 shows a block diagram of the AFE circuit of FIG. 3, as configured for the second step of the two-step training algorithm, according to one embodiment of the present invention.

FIG. 5 shows a block diagram of AFE circuit 300 of FIG. 3, as configured for the second step of the two-step training algorithm, according to one embodiment of the present invention. As shown in FIG. 5, for the second training step, in addition to the components described previously in the context of FIG. 3, AFE circuit 300 comprises path equivalent filter 404 of FIG. 4 and a coefficient update unit 502.

As configured for the second training step, path equivalent filter 404 receives the digital signal generated by EC 4:1 decimator 301 and generates a digital filtered signal, which is applied to coefficient update unit 502. Coefficient update unit 502 receives the digital RX signal generated by RX digital filter 222 as well as the digital filtered signal from path equivalent filter 404 and generates control signals used to update the coefficients in EC estimation filter 302. The thick arrow in FIG. 5 indicates these control signals.

Figure 6:
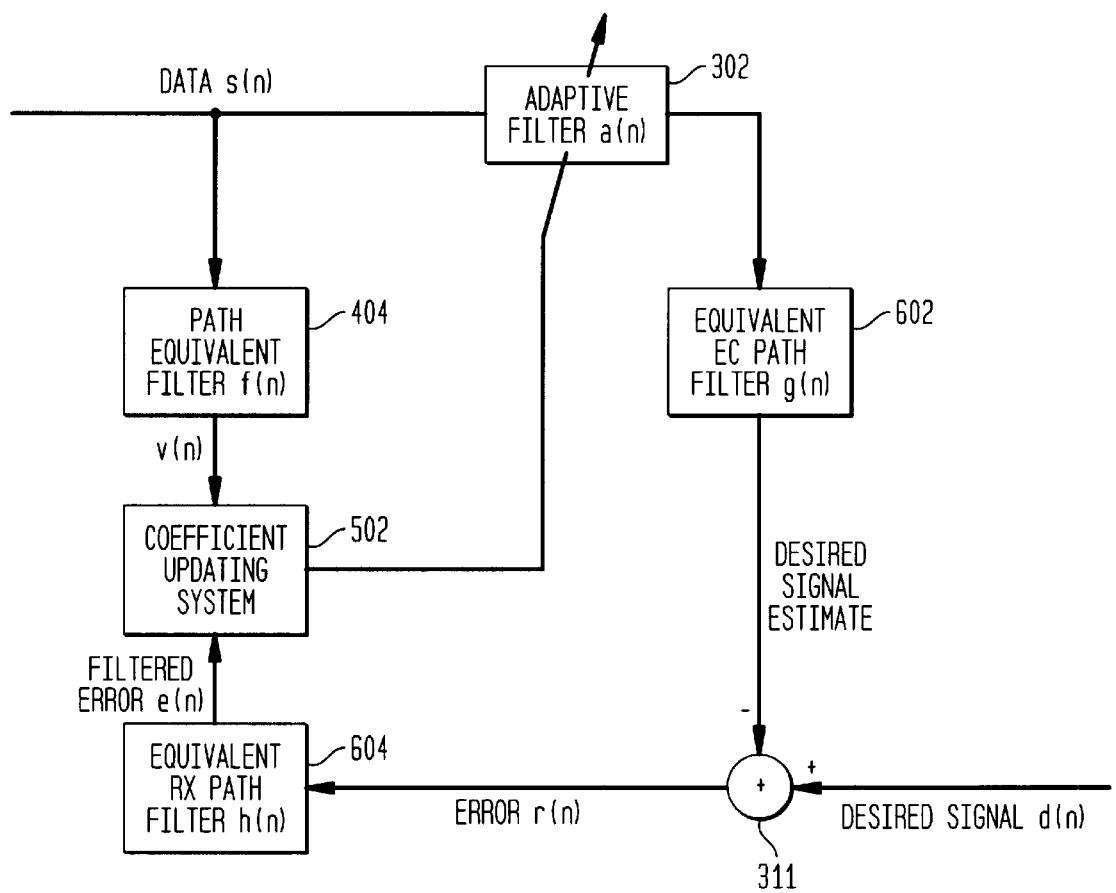
FIG. 6 shows a simplified configuration for the echo cancellation processing performed by the AFE circuit of FIG. 3 during the second training step represented in FIG. 5, in which the coefficients for the EC estimation filter of FIG. 3 are determined.

FIG. 6 shows a simplified configuration for the echo cancellation processing performed by AFE circuit 300 of FIG. 3 during the second training step represented in FIG. 5, in which the coefficients for EC estimation filter 302 are determined. In FIG. 6:

Adaptive filter a(n) represents EC estimation filter 302;

Equivalent EC path filter g(n) 602 represents the combination of EC 1:32 interpolator 304, EC sigma-delta DAC 306, EC analog LPF 308, and EC PGA 310 along the EC path;

Equivalent RX path filter h(n) 604 represents the combination of RX PGA 212, RX analog LPF 214, RX sigma-delta ADC 216, RX 8:1 decimator 218, and RX 4:1 decimator 220 along the RX path;

Path equivalent filter.An) represents path equivalent filter 404 of FIG. 4;

Data signal s(n) represents the digital signal generated by EC 4:1 decimator 301;

Desired signal estimate represents the analog estimated echo signal generated by the EC path at EC PGA 310;

Desired signal d(n) represents the analog RX signal prior to echo cancellation at summation node 311;

Error signal r(n) represents the analog RX signal after echo cancellation as generated at summation node 311;

Filtered error signal e(n) represents the digital RX signal generated by the RX path at RX digital filter 222; and Filtered data signal v(n) represents the digital signal generated by path equivalent filter 404.

Note that, in the configuration of FIG. 6, the data signal s(n) is not used directly for coefficient updating. Instead, its filtered version v(n) is used. This indicates that path equivalent filter f(n) should be equal to the convolution of h(n) and g(n) (i.e., h(n)*g(n)). In other words, the path equivalent filter f(n) is equal to the combined EC and RX paths with the adaptive filter a(n) (i.e., EC estimation filter 302) excluded.

Given the configuration of FIG. 6, the relationships of Equations (1) and (2) apply as follows:

$$e(n)=h(n)*(d(n)-s(n)*g(n)*a(n)) \quad (1)$$

and $$v(n)=s(n)*f(n)=s(n)*h(n)*g(n) \quad (2)$$

where "*" represents the convolution operator. From these relationships, the coefficient updating formula for adaptive filter a(n) can be derived as follows.

By expanding and substituting based on Equation (2), Equation (1) can be rewritten as Equation (3) as follows:

$$e(n)=h(n)*d(n)-a(n)*v(n) \quad (3)$$

The corresponding cost function C based on the mean square error can then be written as Equation (4) as follows:

$$C(a_0, a_1, \ldots, a_{L-1})=E\{e^2(n)\} \quad (4)$$

where the $a_i$'s are the L coefficients of adaptive filter a(n) and E is the expectation value of the square of the filtered error signal e(n). A typical value for the length L of the adaptive filter a(n) is 128.

The gradient of each adaptive filter coefficient $a_i$ can be represented by Equation (5) as follows:

$$\nabla_i = \frac{\partial C}{\partial a_i} = -2 \cdot E\left\{e(n) \cdot \frac{\partial}{\partial a_i}\left(\sum_{i=0}^{L-1} a_i \cdot v(n-i)\right)\right\} = -2 \cdot E\{e(n) \cdot v(n-i)\} \quad (5)$$

Accordingly, during training, each coefficient $a_i$ of adaptive filter a(n) should be updated toward the opposite direction of its gradient, as represented by Equation (6) as follows:

$$a_i(n+1)=a_i(n)+\mu \cdot e(n) \cdot v(n-i) \quad (6)$$

where $\mu$ is the step size. In theory, to guarantee convergence, the step size $\mu$ should be less than $2/\lambda_{max}$ where, $\lambda_{max}$ is the maximum eigenvalue of the autocorrelation matrix of the input signal. In practice, the value of $\mu$ can be determined experimentally by initially using a small number that makes the process converge, and then increasing its value gradually until the training diverges. The step size $\mu$ can then be selected as ½ to ⅓ of this marginal value.

Given the configuration of FIG. 6, one issue is how to determine the coefficients $f_i$ of path equivalent filter f(n). In theory, the equivalent EC path filter g(n) and the equivalent RX path filter h(n) are known from the designs of the various components that those path filters represent. In reality, this will typically not be true. For example, the analog low-pass filters (i.e., EC analog LPF 308 in the EC path and RX analog LPF 214 in the RX path) will typically have a cutoff-frequency variation of plus or minus 8 percent. Furthermore, the operating characteristics of many analog devices will be different at different operating temperatures. As such, the training algorithm in accordance with embodiments of the present invention has an initial training step that is implemented prior to the training step represented by FIG. 6 (and FIG. 5) and during which the coefficients of path equivalent filter f(n) (i.e., path equivalent filter 404 of FIGS. 4 and 5) are determined using a least mean square (LMS) algorithm.

Training Step One: Determining Coefficients of the Path Equivalent Filter

Figure 7:
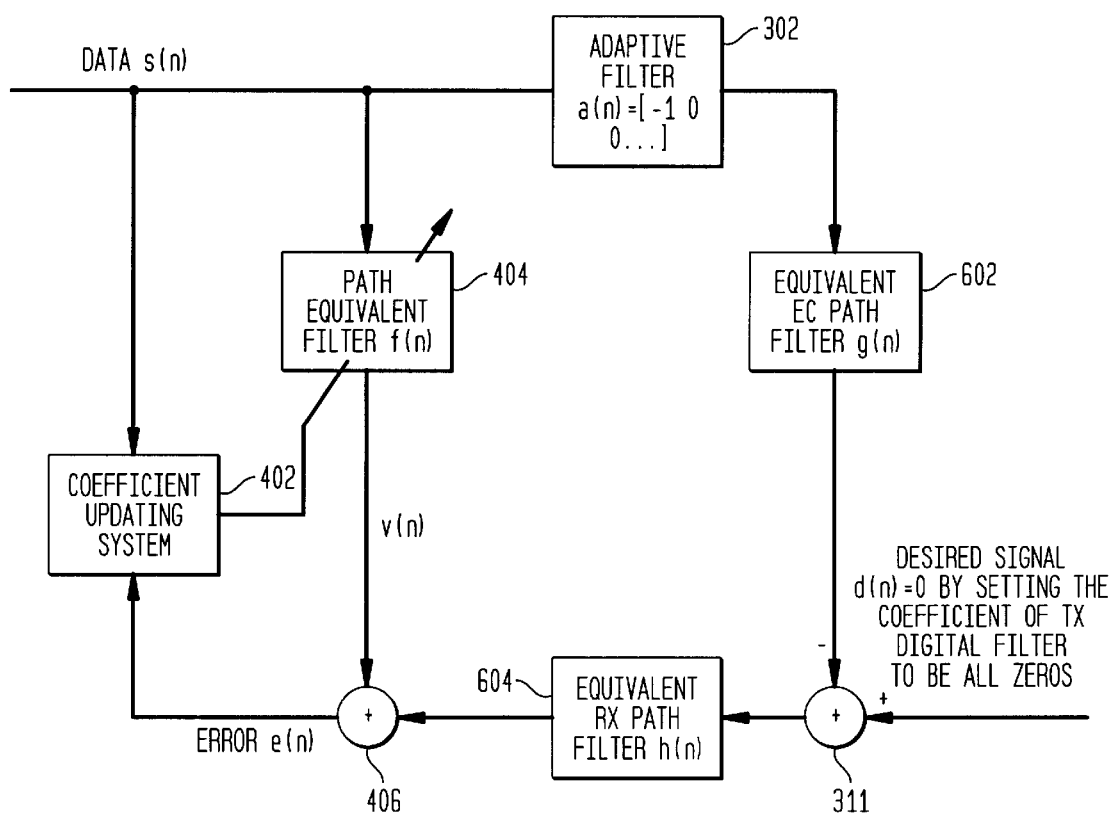
FIG. 7 shows a simplified configuration for the echo cancellation processing performed by the AFE circuit of FIG. 3 during the first training step represented in FIG. 4, in which the coefficients for the path equivalent filter of FIG. 4 are determined.

FIG. 7 shows a simplified configuration for the echo cancellation processing performed by AFE circuit 300 of FIG. 3 during the first training step represented in FIG. 4, in which the coefficients for path equivalent filter 404 are determined. The components and signals in FIG. 7 are the same as those in FIG. 6, except that:

Coefficient update unit 502 is disabled;

Coefficient update unit 402 is used to update the coefficients of path equivalent filter f(n) 404; and Error signal e(n) represents the digital signal generated at summation node 406.

The first training step can be initiated by setting the coefficients $f_i$ of path equivalent filter f(n) to a set of calculated coefficients based on nominal values, or simply by setting all of the coefficients to zero. A typical value for the length of path equivalent filter f(n) is 64. Simulation results show that the coefficients will converge quickly from an initial all-zero setting. Good convergence has been observed after 2048 samples (at a sampling rate of 552 KHz) or 16 Digital Multi-Tone (DMT) symbols.

During the first training step, no analog RX signal is applied to AFE circuit 300, and desired signal d(n) is set to zero, so that echo from the transmit path will not interfere with training. This can be achieved by setting all of the coefficients of TX digital shaping filter 202 to zero. In addition, during the first training step, the coefficients of adaptive filter a(n) (i.e., EC estimation filter 302) are preferably fixed at $\{-1, 0, 0, \ldots\}$. As such, the effect of adaptive filter a(n) is-removed and the negative sign on the first filter coefficient $a_0$ compensates for the fact that the signal generated by equivalent EC path filter g(n) is subtracted from zero at summation node 311. The initial coefficient settings for the various filters are preferably achieved by loading the desired values of the coefficients from digital unit 102 into the digital part of AFE circuit 300.

After the coefficients of filters a(n) and f(n) (as well as those of TX digital shaping filter 202) are correctly set, path equivalent filter f(n) is trained by transmitting independent (e.g., white noise) signals through the EC path. Error signal e(n) for coefficient update unit 402 is formed at summation node 406 by subtracting filtered signal v(n) generated by path equivalent filter f(n) from the signal generated by the RX path. Coefficient update unit 402 preferably employs an LMS algorithm to update the coefficients of path equivalent filter f(n). The coefficient update formula for the LMS algorithm is represented by Equation (7) as follows:

$$a_{n+1}(i) = a_n(i) + \mu \cdot e(n) \cdot s(n-i) \quad (7)$$

where $\mu$ is the step size.

Training Step Two: Determining Coefficients of the EC Estimation Filter

After the loop equivalent filter f(n) is well trained, its coefficients are preferably fixed and the same LMS coefficient update unit may then be used to train adaptive filter a(n) based on the configuration shown in FIGS. 5 and 6. Before the second training step begins, the proper coefficients are downloaded into TX digital shaping filter 202 and the coefficients for adaptive filter a(n) (i.e., EC estimation filter 302) are initialized (e.g., to all zeros). With no analog RX signal applied, a sequence of digital TX signals is applied to train adaptive filter a(n). Simulation results indicate that adaptive filter a(n) will converge within 20480 samples or 160 DMT symbols.

In accordance with the T1.413 Specification (T1.413 Issue 2 of Draft Standard of ADSL, ANSI T1E1.4/98-007R5 (Nov. 30, 1998) and the G.992.1 Specification (Draft Recommendation for ADSL Transceivers, ITU-T G.992.1 (July 1999), 512 DMT symbols are allocated for echo cancellation training. With the two-step training algorithm of the present invention, 176 symbols or 34% of the total allocation of symbols are used to train the analog-domain echo cancellation circuitry of FIG. 3 (i.e., 16 symbols during the first training step and another 160 symbols during the second training step). This leaves another 336 symbols available to train any digital-domain echo cancellation that is implemented within digital unit 102 of the ADSL modem.

As suggested above, the present invention is preferably implemented with a single coefficient update unit that is (1) configured for the first training step as coefficient update unit 402 of FIG. 4 to determine the coefficients of path equivalent filter 404 and (2) then reconfigured for the second training step as coefficient update unit 502 of FIG. 5 to determine the coefficients of EC estimation filter 302. In alternative embodiments of the present invention, AFE circuit 300 may be implemented with two different coefficient update units.

In a preferred embodiment, the coefficients of both path equivalent filter 404 and EC estimation filter 302 are determined using an LMS algorithm. Those skilled in the art will understand that types of training algorithms other than LMS algorithms, such as a sign-LMS, variable-step LMS, fuzzy logic-based LMS, or recursive least square (RLS) algorithm, can be used to train either path equivalent filter 404 or EC estimation filter 302 or both.

In a preferred embodiment of the present invention, after training is completed, AFE circuit 300 is configured for real signal processing by disabling the one or more coefficient update units and the path equivalent filter and fixing the coefficients of EC estimation filter 302 to the coefficient values generated during the second training step. In alternative embodiments, EC estimation filter 302 may be configured for real signal processing as an adaptive filter whose coefficients are updated during real signal processing. In these alternative embodiments, one or more of coefficient update unit 402, path equivalent filter 404, and coefficient update unit 502 may remain enabled in AFE circuit 300 for real signal processing.

Those skill in the art will understand that the present invention can be implemented in AFE circuits having configurations that are different from the exact configuration shown in FIG. 3 for AFE circuit 300. For example, the particular interpolators and decimators shown depend, at least in part, on the fact that the DAC and ADC functions are sigma-delta DAC and ADC functions. Other types of DAC and ADC functions may require other interpolators and/or decimators or even no interpolators and/or decimators. Similarly, EC 4:1 decimator 301 is an optional component that can be modified, moved, or even eliminated in other implementations of the present invention. In addition, the various digital filters (such as filters 202 and 222) and analog filters (such as filters 208 and 214) can be modified, moved, or even eliminated in certain embodiments, as can amplifiers 210, 212, and/or 310. Furthermore, other embodiments may have additional components not shown in FIGS. 3–5, such as additional filters and the like.

Although the present invention has been described in the context of an AFE circuit for an ADSL modem, those skilled in the art will understand that the present invention can be implemented for other applications, including other DSL modems, such as symmetric DSL (SDSL), high-speed DSL (HDSL), and very high-speed DSL (VDSL) modems, as well as non-DSL modems or other interface circuits that integrate analog and digital parts of communications systems.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal, processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. In a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of:

(a) training a path equivalent filter to be substantially equivalent to a combination of the EC and RX paths, while keeping the EC estimation filter fixed; and (b) then training the EC estimation filter, with the path equivalent filter trained during step (a).

2. The invention of claim 1, wherein the circuit is an analog front-end (AFE) circuit for an asymmetric digital subscriber line (ADSL) modem.

3. The invention of claim 1, wherein the circuit is an AFE circuit that forms part of an ADSL modem.

4. The invention of claim 1, wherein the path equivalent filter is disabled during real signal processing.

5. The invention of claim 1, wherein step (a) comprises the step of disabling the TX path.

6. The invention of claim 1, wherein the path equivalent filter is trained during step (a) using a least mean square (LMS) algorithm.

7. The invention of claim 1, wherein step (a) comprises the step of initializing coefficients of the path equivalent filter to all zeros.

8. The invention of claim 1, wherein step (a) comprises the step of applying a noise signal to the path equivalent filter and to the EC path.

9. The invention of claim 1, wherein step (a) comprises the step of fixing coefficients of the EC estimation filter to $\{-1, 0, 0, \ldots\}$.

10. The invention of claim 1, wherein step (b) comprises the step of enabling the TX path.

11. The invention of claim 1, wherein the EC estimation filter is trained during step (b) using an LMS algorithm.

12. The invention of claim 1, wherein step (b) comprises the step of initializing coefficients of the EC estimation filter to all zeros.

13. The invention of claim 1, wherein step (b) comprises the step of applying a sequence of signals to the TX and EC paths and to the path equivalent filter.

14. The invention of claim 1, wherein step (b) comprises the step of fixing coefficients of the path equivalent filter to values generated during step (a).

15. The invention of claim 1, wherein:

the circuit is an AFE circuit for an ADSL modem;

the path equivalent filter is disabled during real signal processing;

step (a) comprises the step of disabling the TX path;

the path equivalent filter is trained during step (a) using an LMS algorithm;

step (a) comprises the step of initializing coefficients of the path equivalent filter to all zeros;

step (a) comprises the step of applying a noise signal to the path equivalent filter and to the EC path;

step (a) comprises the step of fixing coefficients of the EC estimation filter to $\{-1, 0, 0, \ldots\}$;

step (b) comprises the step of enabling the TX path;

the EC estimation filter is trained during step (b) using an LMS algorithm;

step (b) comprises the step of initializing coefficients of the EC estimation filter to all zeros;

step (b) comprises the step of applying a sequence of signals to the TX and EC paths and to the path equivalent filter; and step (b) comprises the step of fixing coefficients of the path equivalent filter to values generated during step (a).

16. A machine-readable medium, having encoded thereon program code, wherein, when the program code is executed by a machine, the machine implements a method for training an EC estimation filter in an echo cancellation (EC) path in a circuit comprising (1) a transmit (TX) path configured to convert a digital TX signal into an analog TX signal; (2) a receive (RX) path configured to convert an analog RX signal into a digital RX signal; and (3) the EC path configured to generate an analog EC signal, based on the digital TX signal, to be subtracted from the analog RX signal prior to digitization, comprising the steps of:

(a) training a path equivalent filter to be substantially equivalent to a combination of the EC and RX paths, while keeping the EC estimation filter fixed; and (b) then training the EC estimation filter, with the path equivalent filter trained during step (a).

17. A circuit comprising:
(1) a transmit (TX) path configured to convert a digital TX signal into an analog TX signal;
(2) a receive (RX) path configured to convert an analog RX signal into a digital RX signal;
(3) an echo cancellation (EC) path configured to generate an analog EC signal, based on the digital TX signal, to be subtracted from the analog RX signal prior to digitization, wherein the EC path comprises an EC estimation filter;
(4) a path equivalent filter; and
(5) one or more coefficient update units, wherein:
during a first training step, one of the one or more coefficient update units is configured to update coefficients in the path equivalent filter to train the path equivalent filter to be substantially equivalent to a combination of the EC and RX paths; and
during a second training step, one of the one or more coefficient update units is configured to update coefficients in the EC estimation filter based on output from the path equivalent filter.

18. The invention of claim 17, wherein the circuit is an AFE circuit for an ADSL modem.

19. The invention of claim 17, wherein the circuit is an AFE circuit that forms part of an ADSL modem.

20. The invention of claim 17, wherein a single coefficient update unit is used for both the first and second training steps.

21. The invention of claim 17, wherein, during the first training step:
the coefficient update unit, the path equivalent filter, and the EC path are configured to receive the same data signal; and
the coefficient update unit is further configured to receive a difference signal between a filtered signal generated by the path equivalent filter and the digital RX signal generated by the RX path.

22. The invention of claim 17, wherein, during the second training step:
the path equivalent filter and the EC path are configured to receive the same data signal; and
the coefficient update unit is configured to receive a filtered signal generated by the path equivalent filter and the digital RX signal generated by the RX path.

23. The invention of claim 17, wherein the path equivalent filter is disabled during real signal processing.

24. The invention of claim 17, wherein the TX path is disabled during the first training step.

25. The invention of claim 17, wherein the path equivalent filter is trained during the first training step using an LMS algorithm.

26. The invention of claim 17, wherein coefficients of the path equivalent filter are initialized to all zeros during the first training step.

27. The invention of claim 17, wherein a noise signal is applied to the path equivalent filter and to the EC path during the first training step.

28. The invention of claim 17, wherein coefficients of the EC estimation filter are fixed to $\{-1, 0, 0, \ldots\}$ during the first training step.

29. The invention of claim 17, wherein the TX path is enabled during the second training step.

30. The invention of claim 17, wherein the EC estimation filter is trained during the second training step using an LMS algorithm.

31. The invention of claim 17, wherein coefficients of the EC estimation filter are initialized to all zeros during the second training step.

32. The invention of claim 17, wherein a sequence of signals is applied to the TX and EC paths and to the path equivalent filter during the second training step.

33. The invention of claim 17, wherein, during the second training step, coefficients of the path equivalent filter are fixed to values generated during the first training step.

34. The invention of claim 17, wherein:
the circuit is an AFE circuit for an ADSL modem;
a single coefficient update unit is used for both the first and second training steps;
during the first training step:
the coefficient update unit, the path equivalent filter, and the EC path are configured to receive the same data signal; and
the coefficient update unit is further configured to receive a difference signal between a filtered signal generated by the path equivalent filter and the digital RX signal generated by the RX path;
during the second training step:
the path equivalent filter and the EC path are configured to receive the same data signal; and
the coefficient update unit is configured to receive a filtered signal generated by the path equivalent filter and the digital RX signal generated by the RX path;
the path equivalent filter is disabled during real signal processing;
the TX path is disabled during the first training step;
the path equivalent filter is trained during the first training step using an LMS algorithm;
coefficients of the path equivalent filter are initialized to all zeros during the first training step;
a noise signal is applied to the path equivalent filter and to the EC path during the first training step;
coefficients of the EC estimation filter are fixed to $\{-1, 0, 0, \ldots\}$ during the first training step;
the TX path is enabled during the second training step;
the EC estimation filter is trained during the second training step using an LMS algorithm;
coefficients of the EC estimation filter are initialized to all zeros during the second training step;
a sequence of signals is applied to the TX and EC paths and to the path equivalent filter during the second training step; and
during the second training step, coefficients of the path equivalent filter are fixed to values generated during the first training step.

* * * * *